United States Patent [19]
Heckmann et al.

[11] Patent Number: 4,904,035
[45] Date of Patent: Feb. 27, 1990

[54] COUPLING DEVICE FOR GUIDING A LIGHT BEAM

[75] Inventors: Siegfried Heckmann, Wuppertal; Johannes Rybach, Langenfeld, both of Fed. Rep. of Germany

[73] Assignee: U.S. Philips Corp., New York, N.Y.

[21] Appl. No.: 233,313

[22] Filed: Aug. 17, 1988

[30] Foreign Application Priority Data

Aug. 22, 1987 [DE] Fed. Rep. of Germany ....... 3728077

[51] Int. Cl.⁴ ................................................ G02B 6/36
[52] U.S. Cl. ................................................ 350/96.2
[58] Field of Search ..................................... 350/96.20

[56] References Cited

U.S. PATENT DOCUMENTS 4,826,272  5/1989  Pimpinella et al. ............... 350/96.2

OTHER PUBLICATIONS

Gallawa, Applied Optics, vol. 26, pp. 1170–1174, Apr. 1, 1987.
Hewlett Packard Journal, pp. 26–27, Feb. 1987.

Primary Examiner—James W. Davie
Attorney, Agent, or Firm—Ernestine C. Bartlett

[57] ABSTRACT

The invention relates to a coupling device for guiding a light beam sent through an end portion of an optical waveguide to the light-sensitive surface of a photodiode of a measuring instrument, in particular, an optical power meter, comprising an absorbing aperture associated with the end face of the optical waveguide, and having an aperture which widens conically towards the light-sensitive face of a photodiode, the aperture plate facing the end face of the optical waveguide with its side where the diameter of said aperture is smallest but slightly larger than the diameter of said end face of the optical waveguide. A device of simple construction and having substantially no reflection is obtained in that the light beam is directed straight to the light-sensitive surface of the photodiode, and the angular aperture $\beta$ of the conical inner surface of the aperture plate is larger than $2 \arctan \alpha_{max}$, $\tan \alpha_{max}$ being the maximum permissible numerical aperture (NA) of an optical waveguide to be connected in accordance with the specifications, of the measuring instrument.

22 Claims, 1 Drawing Sheet

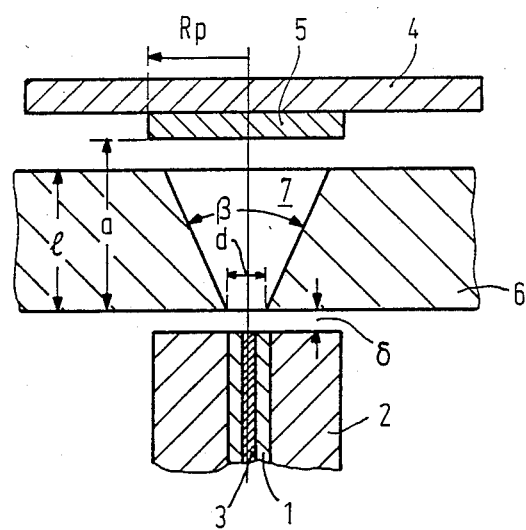

COUPLING DEVICE FOR GUIDING A LIGHT BEAM

FIELD OF THE INVENTION

The invention relates to a coupling device for guiding a light beam sent through an end portion of an optical waveguide to the light-sensitive surface of a photodiode of a measuring instrument, in particular, an optical power meter, comprising an absorbing aperture plate associated with the end face of the optical waveguide, and having an aperture which widens conically towards the light-sensitive face of a photodiode, the aperture plate facing the end face of the optical waveguide with its side where the diameter of said aperture is smallest but slightly larger than the diameter of said end face of the optical waveguide.

BACKGROUND OF THE INVENTION

In particular, optical power meters which are intended for use as universal measuring instruments, should allow connection of a wide variety of optical waveguides (single-mode fibres, multi-mode fibres, thick-core fibres etc.). In general, the waveguide end portions are accommodated in connector ferrules of widely varying shape and dimensions depending on the connector construction. Mechanical adaptation of various waveguide-connector elements to the measuring-instrument receptacle behind which the photodiode is located, is achieved by means of exchangeable adaptors.

Applied Optics, Vol. 26, pp. 1170–1174 describes the problem that the influence of interreflections between the reflecting surface of the photodiode on the one hand and the end faces of the waveguide connector elements on the other hand differs appreciably and may lead to substantial measurement errors depending on the type of connector. The additional amount of light reaching the photodiode due to interreflections differs for different connector types because the reflection from their end faces which face the photodiodes differs intrinsically. For this reason, interreflections should be avoided or, at least, minimized.

In a device of the type mentioned in the opening paragraph, which is known from Hewlett Packard Journal 1987, pp. 26 and 27, an adaptor is slid onto the end of an optical waveguide which is accommodated in a connector ferrule, which adaptor, in front of the end face of the optical waveguide comprises an aperture plate whose aperture is locally widened to obtain a conical portion (300 μm). A lens directs the emerging light to a photodiode having a surface which is inclined relative to the end face of the optical waveguide. This device is rather intricate. A lens brings about additional reflections.

SUMMARY OF THE INVENTION

An object of the invention is to construct a coupling device for guiding a light beam sent through an end portion of an optical waveguide to the light-sensitive surface of a photodiode of a measuring instrument in such a way that it is simple yet substantially free from interreflections.

This object is achieved, for example, in an optical power meter comprising an absorbing aperture plate associated with the end face of the optical waveguide and having an aperture which widens conically towards the light-sensitive face of a photodiode, the aperture plate facing the end face of the optical waveguide with its side where the diameter of said aperture is smallest but slightly larger than the diameter of said end face of the optical waveguide, in that the light beam is directed straight to the light-sensitive surface of the photodiode, and the angular aperture $\beta$ of the conical inner surface of the aperture plate is larger than 2 arc tan $\alpha_{max}$, tan $\alpha_{max}$ being the maximum permissible numerical aperture (NA) of an optical waveguide to be connected in accordance with the specifications of the measuring instrument.

Unfortunately, it is not possible to realize the ideal situation, that is to cover the reflective surfaces of the waveguide-connector elements up to the core area of the waveguide wholly with a completely reflection-free layer. The diameter d of the aperture should at least be equal to the diameter $d_{max}$ of the core of the "thickest-"optical waveguide in conformity with the instrument specifications. Moreover, it has to be noted that depending on tolerances the waveguide axis may be off-centered from the central axis of the photodiode. This means that the diameter d must be increased additionally by an amount equal to this offset. If the aperture plate does not directly adjoin the waveguide end face a further increase in aperture size is required. In practice, distances up to 10 μm may be inevitable. If the diameter $d_{max}$ is selected so as to be smaller than 20 times the cladding diameter of the optical waveguide, tolerably small interreflections are obtained.

It was recognized that the effect of inevitable residual reflections is minimal if the distance between the end face of the optical waveguide and the light-sensitive surface of the photodiode is large. The distance a should preferably be selected in the range from $5R_p \geq a \geq 1.7R_p$, Rp being the outer radius of the light-sensitive surface of the photodiode.

A very advantageous solution is characterized in that the distance a is selected as follows:

$$a = \frac{R_p - 1.5 R_{kmax}}{\tan \alpha_{max}} \cdot \rho_1$$

wherein $R_{kmax}$ is the maximum core radius of an optical waveguide to be connected in accordance with the specifications of the measuring instrument and $\rho$ is a dimensionless factor in the range from $1 \geq p \geq 0.8$, and in that the diameter d ranges from $7R_{kmax} \geq d \geq 2,5R_{kmax}$. The distance a is selected in such a way that even in the most unfavourable situation, if a waveguide having the maximum permissible numerical aperture (tan $\alpha$) and the maximum permissible core diameter ($d_{kmax}$) in conformity with the instrument specifications is connected, no radiation will be incident outside the light-sensitive surface of the photodiode (radius $R_p$) although the safety margin is only small, so that the maximum amount of light is captured.

The aperture plate should extend over at least 20% of the distance between the optical waveguide and the photodiode. In accordance with a preferred embodiment of the invention the aperture cone extends over at least 40% of the distance a between aperture plate at the location of its smallest diameter and the photodiode.

An absorbing surface (for example a black coating) is not completely free from reflection. However, the inclined conical aperture surface provided with an absorbent coating gives rise to multiple absorptions so only a vanishingly small amount of light reaches the photodiode.

With a view to this effect of the inclined surface, the conical aperture should be arranged as close to the photodiode as the construction permits. The apex angle $\beta$ of the cone should maximally be twice as large as the apex angle of the cone of light emitted by an optical waveguide having the maximum permissible numerical aperture, but preferably it should only be slightly larger (up to 10%).

In principle, all customary optical waveguides can be connected to a measuring device if the distance a is dimensioned so that tan $\alpha_{max}$ ranges from 0.3 to 0.35. For a universal measuring instrument values of a between 2.5 and 3 mm are advantageous when a diode having a radius $R_p = 1$ mm is used.

It is preferred to use a construction in which the aperture plate is integrated in the measuring instrument. All in all it is more costly to provide each adaptor with an aperture plate which, moreover, is not protected from damage. However, such a solution is necessary when a measuring instrument is to be used which does not comprise an aperture plate in accordance with the invention.

BRIEF DESCRIPTION OF THE DRAWING

The invention will now be explained in more detail by means of a description of an examplary embodiment which is diagrammatically shown in the drawing.

The FIGURE is a secitonal view of the elements which are relevant for coupling.

DETAILED DESCRIPTION OF PREFERRED EMBODIMENTS

An optical waveguide 1 is mounted in a connector ferrule 2. The object is to measure the power of the light emanating from the core 3. For this purpose an optical power meter is used, of which only a photodiode 4 having a light-sensitive surface 5 and an aperture plate 6 are shown. The connector ferrule 2 must be fitted in a receptacle, not shown, of the optical power meter, if necessary by means of an adaptor, such that the central axis of the core 3 of the waveguide 1 is aligned to be accurately coaxial with the optical axis of the optical power meter, which optical axis extends through the center of the light-sensitive surface 5, and coincides with the central axis of the conical aperture 7. Any offset which cannot be avoided as a result of tolerances should be as small as possible.

In the case of an optical power meter which, in accordance with its specifications, is intended for use with optical waveguides having a maximum core diameter $d_{kmax} = 160$ μm and a maximum numerical aperture tan $\alpha_{max} = 0.35$, and comprising a photodiode having a light-sensitive surface with a diameter $2R_p = 2$ mm, the following values were selected for the dimensions indicated in the drawing:
a = 2.7 mm
l = 1.3 mm
$\beta = 41°$
$\delta \approx 0$ mm
d = 0.5 mm In this device in accordance with the invention, the effects of the interreflections were so small that, considering the given measurement accuracy, they could not be detected, although the minimum aperture diameter d was substantially larger than the theoretical optimum value $d_{kmax} = 0.16$ mm.

What is claimed is:

1. A coupling device for guiding a light beam sent through an end portion of an optical waveguide to the light-sensitive surface of a photodiode of a measuring instrument comprising an absorbing aperture plate associated with the end face of the optical waveguide, and having an aperture which widens conically towards the light-sensitive face of a photodiode, the aperture plate facing the end face of the optical waveguide with its side where the diameter of said aperture is smallest but slightly larger than the diameter of said end face of the optical waveguide, where in the light beam is directed straight to the light-sensitive surface of the photodiode, and the angular aperture $\beta$ of the conical inner surface of the aperture plate is larger than 2 arc tan $\alpha_{max}$, tan $\alpha_{max}$ being the maximum permissible numerical aperture of an optical waveguide to be connected in accordance with the specifications of the measuring instrument.

2. A coupling device as claimed in claim 1, where in a distance a between the aperture, at the location of its smallest diameter d, and the surface of the light-sensitive layer of the photodiode, is selected in the range from $5R_p \geq a \geq 1.7R_p$, $R_p$ being the outer radius of the light-sensitive surface of the photodiode.

3. A coupling device as claimed in claim 1 or 2 wherein a distance a between the aperture, at the location of its smallest diameter d, and the surface of the light-sensitive layer of the photodiode, is selected according to the equation:

$$a = \frac{R_p - 1.5 R_{kmax}}{\tan \alpha_{max}} \cdot \rho$$

wherein $R_{kmax}$ is the maximum core radius of an optical waveguide to be connected in accordance with the specifications of the measuring instrument and $\rho$ is a dimensionless factor in the range from $1 \geq \rho \geq 0.8$, and in that the diameter d ranges from $7R_{kmax} \geq d \geq 2.5R_{kmax}$.

4. A device as claimed in claim 1 or 2, wherein the apex angle $\beta$ of the conical aperture has a value in the range from $2.2\alpha_{max} \geq \beta \geq 2\alpha_{max}$.

5. A coupling device as claimed in claim 1, characterized in that the apex angle $\beta$ of the conical aperture has a value in the range from $2.2\alpha_{max} \geq \beta \geq 2\alpha_{max}$.

6. A device as claimed in claim 1, wherein the aperture cone extends over at least 40% of the distance a between the aperture plate at the location of its smallest diameter and the photodiode.

7. A device as claimed in claim 1, wherein the measuring instrument is dimensioned for a value tan $\alpha_{max} = 0.3$–0.35.

8. A device as claimed in claim 2, wherein the distance a = 2.5 to 3 mm.

9. A device as claimed in claim 1, wherein the aperture plate is integrated in the measuring instrument.

10. A device as claimed in claim 1, wherein the aperture plate forms part of a connector adaptor for connectorized optical waveguides.

11. A device as claimed in claim 1, wherein the distance between the aperture plate and the end face of the optical waveguide is less than 10 μm.

12. A device as claimed in claim 3, wherein the apex angle $\beta$ of the conical aperture has a value in the range from $2.2\alpha_{max} \geq \beta \geq 2\alpha_{max}$.

13. A device as claimed in claim 2, wherein the aperture cone extends over at least 40% of the distance a between the aperture plate at the location of its smallest diameter and the photodiode.

14. A device as claimed in claim 3, wherein the aperture cone extends over at least 40% of the distance a between the aperture plate at the location of its smallest diameter and the photodiode.

15. A device as claimed in claim 4, wherein the aperture cone extends over at least 40% of the distance a between the aperture plate at the location of its smallest diameter and the photodiode.

16. A device as claimed in claim 2, wherein the measuring instrument is dimensioned for a value $\tan \alpha_{max} = 0.3$–$0.35$.

17. A device as claimed in claim 3, wherein the measuring instrument is dimensioned for a value $\tan \alpha_{max} = 0.3$–$0.35$.

18. A device as claimed in claim 4, wherein the measuring instrument is dimensioned for a value $\tan \alpha_{max} = 0.3$–$0.35$.

19. A device as claimed in claim 6, wherein the measuring instrument is dimensioned for a value $\tan \alpha_{max} = 0.3$–$0.35$.

20. A device as claimed in claim 2, wherein the distance $a = 2.5$ to 3 mm.

21. A device as claimed in claim 6, wherein the distance $a = 2.5$ to 3 mm.

22. A device as claimed in claim 7, wherein the distance $a = 2.5$ to 3 mm.

* * * * *